United States Patent Office 3,304,611
Patented Feb. 21, 1967

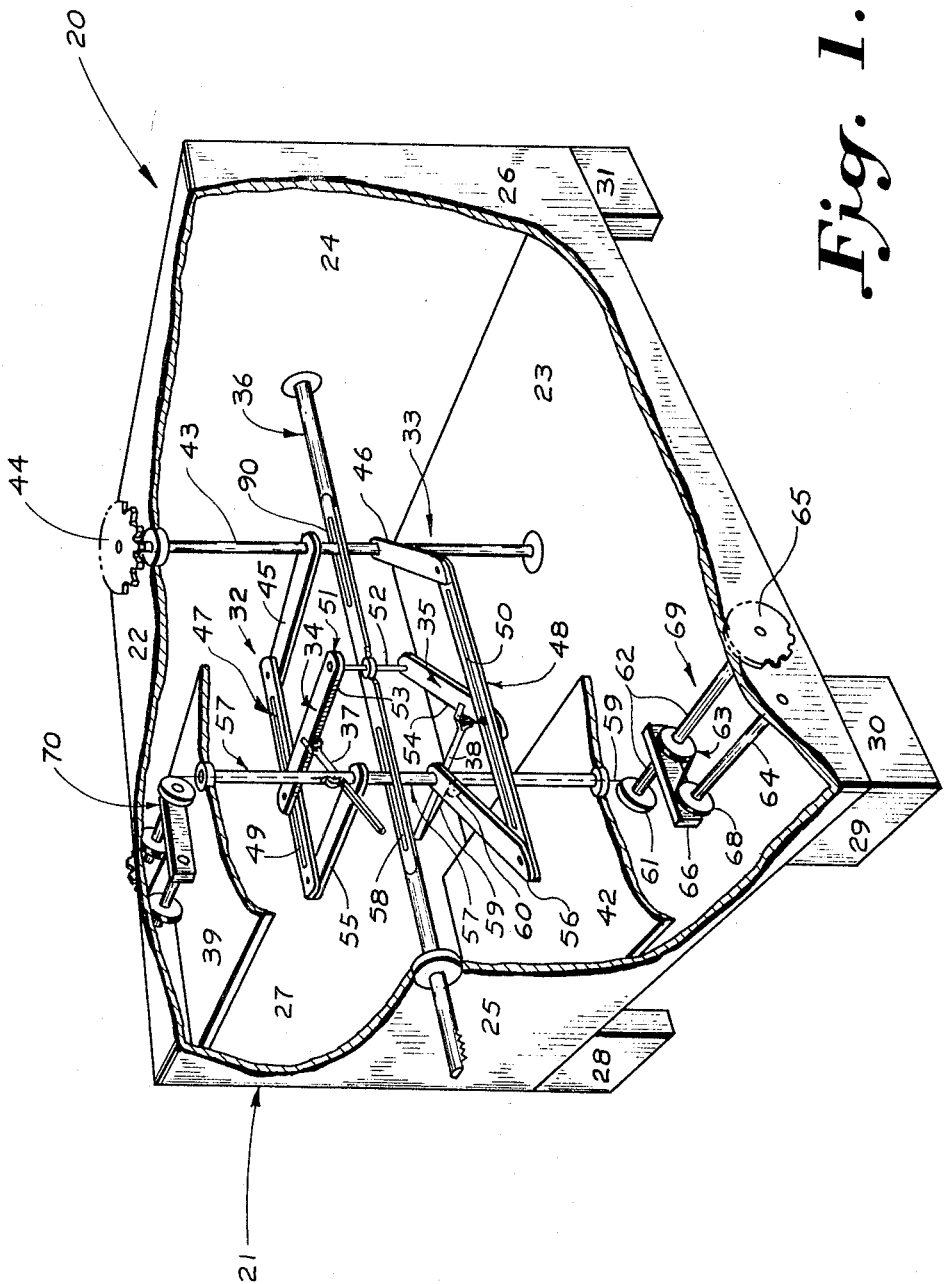

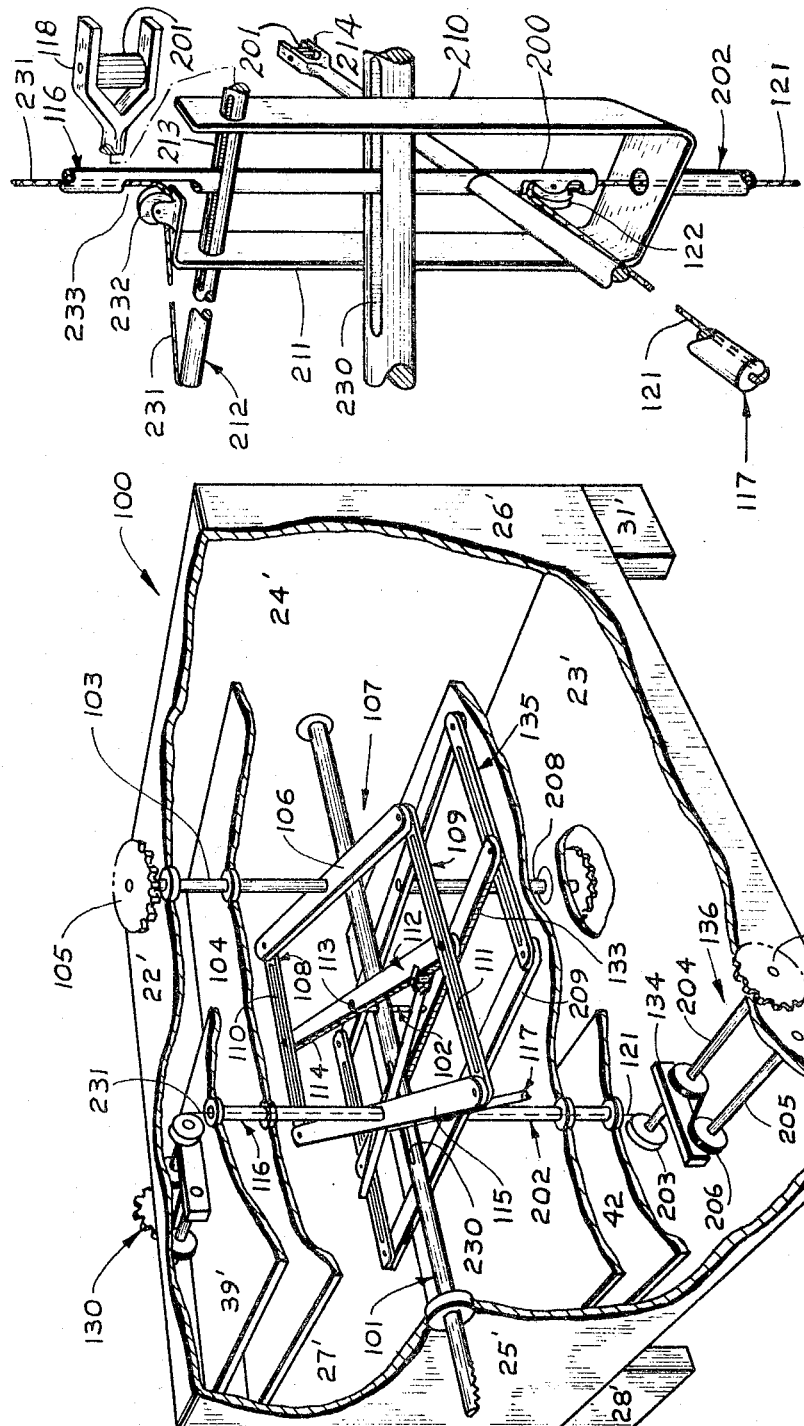

3,304,611
COMPONENT COMPUTERS
Donald J. Abel, 712 Summit Ave.,
Franklin Lakes, N.J. 07417
Filed Oct. 7, 1963, Ser. No. 314,311
7 Claims. (Cl. 33—1)

This invention relates in general to component computers and more particularly to those where two unknowns are solved from three known quantities.

It is an object of the instant invention to provide a device that is not limited to the solution of right triangles.

A further object is to provide a device whose moving parts are light in weight, and balanced in a manner so the input drives do not have to move against high inertia forces.

Another object of the invention is to provide a device that will solve two sides from continuously varying angle, side, angle information.

A further object of the invention is to provide a simple device that will solve two sides from one fixed angle and continuously varying angle, and side.

It is also an object to provide a device that can be easily ganged for the solution of higher order problems other than plane triangles.

An additional object is to provide a device capable of processing relatively large input angles.

Another object is to provide a device with the capability of operation over very small or large variations in the length of the input side.

Another object of the invention is to provide a device that will solve two functions having any combination of the known functions fixed or variable.

Other objects of the instant invention will become apparent in the course of the following specification.

In the attainment of the aforesaid objectives, subject computer is made in two embodiments. The first embodiment has two outputs and two inputs with the third known function being fixed. Upper and lower parallel mechanisms move fixed relative to each other driven by an angular input shaft. The upper and lower following links are also fixed relative to each other and positioned by, but rotatable in the input member. As a result, the angular and linear movements of the mechanism's two component members is obtained. These positions are transmitted external to the unit. A limitation of the first embodiment with respect to the second embodiment is that it only solves the family of triangles the sum of whose base angles is constant.

A second embodiment differs from the first in that there are three inputs for two outputs. The upper and lower parallel mechanisms and following links must therefore move independent of each other. Because the following links are not rigidly positioned with respect to each other their two ends must be supported on the parallel mechanism.

In both embodiments rotational movements of the output shafts are controlled by the parallel mechanisms, whereas the linear position of the component members is a function of the rotation and translation of the following link. The invention will appear more clearly from the following detail description when taken in conjunction with the accompanying drawings showing by way of example the preferred embodiments of the inventive concept.

In the drawings:

FIGURE 1 is a perspective view of the first computer embodiment with a portion of the casing broken away to show the complete mechanism.

FIGURE 2 is a perspective view of the second computer embodiment with a portion of the casing broken away to show the complete mechanism.

FIGURE 3 is a perspective view of the output shafts and component members of FIGURE 2 with other components omitted for clarity.

Referring now to the first embodiment of the computer shown in FIGURE 1 reference numeral 20 indicates the computer.

The computer 20 is constituted in part of a casing 21 which is formed with a top member 22, a bottom member 23, two side members 26 and 27, and two end members 24 and 25. The members are secured together along corresponding edges and the casing is held upright by legs attached to the bottom member 23 at each corner, four of the legs being indicated by numerals 28, 29, 30, and 31.

Within the casing 21 are the upper and lower parallel mechanisms 32 and 33 respectively, the upper and lower following links 34 and 35, the input member 36; and component members 37 and 38. For support of the mechanism described are plates 39 and 42 secured to casing 21 by any known means. Angular input shaft 43 is supported in top member 22, bottom member 23, by bearings; and driven external from the unit through gear 44 fixed to it. An opening 90 in input member 36 allows the passage of angular input shaft 43 through input member 36 without restricting the movement of input member 36 in a linear direction. On angular input shaft 43 at a preselected angle to each other are drive links 45 and 46 on upper parallel mechanism 32 and lower parallel mechanism 33 respectively. Fixed to drive links 45 and 46, but rotatable are intermediate links 47 and 48 respectively attached. Slots 49 and 50 in intermediate links 47 and 48 extend for a major portion of their length to accept roller ends of upper and lower following links 34 and 35 to balance and guide the follower assembly 51 which rotates in input member 36. Upper following link 34 is fixed to shaft 52 upon which lower following link 35 is also fixed. The angular relation of the aforementioned links 34 and 35 is the same as that angle between drive links 45 and 46 on angular input shaft 43. Shaft 53 of follower assembly 51 being fixed but rotatable in input member 36 is moved in a linear direction by said input member along upper and lower parallel mechanisms 32 and 33, and rotated by said mechanisms. For clarity of viewing, upper and lower parallel mechanisms have been shown in perspective and apart, but for construction it is desirable to keep them as close as possible. Face 53 of upper following link 34 and face 54 of lower following link 35 are toothed sections similar to rack construction for nonslippage and registration of component members 37 and 38. End links 55 and 56 fixed to, but rotatable with intermediate links 47 and 48 respectively, are fixed to output shaft 57 in the same angular relationship as the drive links 45 and 46, and following links 34 and 35. The end links 55 and 56 rotate output shaft 57 from the parallel mechanisms. A second opening 58 in input member 36 is sufficient to pass output shaft 57 without restricting the linear movement of input member 36. Input member 36 is retained in position by bearings mounted in end members 24 and 25. Output shaft 57 is held by bearings in plates 39 and 42. Openings just above and below end links 55 and 56 respectively in output shaft 57 accept the linear moving component members 37 and 38. Component member 38 is retained by the direction of the opening in shaft 57 to be in spaced parallel arrangement with following link 34. Component member 37 is restrained by the direction of its opening in shaft 57 to be in spaced parallel arrangement with following link 35. The aforementioned members 37, 34, 38, and 35 form a parallelogram of which members 38 and 34 are equal, and members 37 and 35 are equal. From the triangle formed by members 37, 34 and 36 the two unknown quantities, members 37 and 34 are produced through component members 37 and 38. Component members are captivated to the following links by their sides which extend above and below the following links. In the openings produced, toothed wheels are fastened to engage in rolling contact the aforedescribed faces 53 and 54 of the following links. Pressure as will be described maintains the component members in contact with the following links at all times. The manner in which it is accomplished is as follows: Cable 59 is secured to the outer end of component member 38 and directed inwardly around pulley 60 which is secured to output shaft 57 then downwardly through the open center of output shaft 57 and around take up pulley 61. The amount of take up will be in proportion to the movable length of the component member. The cable is located along the centerline of the output shaft 57 so twisting will be kept to a minimum. Block 66 is secured to plate 42 and retains rotating shaft 62 and stationary shaft 64 between it and side member 26. Take up pulley 61 is fixed to rotating shaft 62. Also fixed to rotating shaft 62 is a constant force spring 63 that produces a tension force in the cable to the end of the component member 38 and maintains its position against the following link 35. Constant force spring 63 will wrap at end 68 about stationary shaft 64 when the component member moves toward the following link. Fixed but removable to rotating shaft 62 is gear 65 which transmits the component member 38 movement to an external receiver. The lower output assembly is designated as numeral 69. In a similar manner the upper output assembly 70 will transmit the motion of component member 37 resulting in a second output. Centerlines of all vertical shafts intersect the horizontal centerline of input member 36.

In operation the upper and lower parallel mechanism are fixed relative to each other on the angular input shaft. This relationship determines the sum of two angles of the triangle to be solved, and may be varied as a design requirement. The position of the angular input shaft therefore determines the magnitude of the sum of the angles at the ends of the side of the triangle whose length is determined by the position of the input member. The length of this side extends from the pivot of the following links to the center of the output shaft. Having three known quantities in a triangle namely angle, side, angle; the other two sides can be solved. An output shaft rotated by both parallel mechanisms constrains the upper component member in spaced parallel arrangement with the lower following link, and the lower component member in spaced parallel arrangement with the upper following link. In the manner described a parallelogram is formed by the component members and the following links of the upper and lower mechanisms having the linear input member always as a diagonal. The two triangles formed with the linear input member as a diagonal of the parallelogram are equal, and present the two opposite component sides to the output shaft where their length may be transmitted to external receivers outside the casing and other than the mechanism illustrated and described. It is seen therefore that two sides of a triangle may be solved by the read out of the component members whose position is determined from the known angles of the angular input shaft, and known linear distance of the linear input member.

Referring now to the second embodiment of the computer shown in FIGURE 2 reference numeral 100 indicates the computer.

The computer 100 is contained in a similar manner as described in the first embodiment with the same parts such as casing, plates, and feet using the same numbers as the first embodiment with the addition of a prime symbol.

Input member 101 held by bearings in end members 24' and 25' holds shaft 102 fixed and 90 degrees to its centerline. The first angular input member 103 is held in bearings in plate 104 and the top member 22', fixed to said first angular input member, is gear 105 for positioning purposes. Attached to the other end of first angular input member 103 is drive link 106 of upper parallel mechanism 107. Fixed but rotatable with it, at both ends of drive link 106 are intermediate links 108 and 109. Riding in opening 110 of intermediate link 108 and opening 111 of intermediate link 109 are roller like ends of following link 112. Rack toothed section 114 is on one edge of following link 112. Following link 112 is free to rotate but not translate about pivot 113 on shaft 102. End link 115 is fixed but rotatable with intermediate links 109 and 108. Also fixed at the middle position of end link 115 and rotatable with it is output shaft 116 positioned by bearings in plates 39' and 104. Output shaft 116 extends from the plates to below input member 101 passing through opening 230. Through an opening in lower end 200 of output shaft 116 and in spaced parallel arrangement with end link 115 is component member 117. The end 214 of component member 117 extends above and below following link 133. Toothed roller 201 of component member 117 as shown in FIGURE 3 engages following link 133. From the other end of component member 117 cable 121 extends around pulley 122 attached to output shaft 116 and down through the open center of output shaft 202 as shown in FIGURE 2 and FIGURE 3. The other end of cable 121 is fixed to take up pulley 203 and extends around it. Take up pulley 203 is fixed to rotating shaft 204 which is mounted in bearings between side member 26' and block 134. The block 134 is attached to plate 42'. Stationary shaft 205 is also mounted between side member 26' and block 134. Fixed to rotating shaft 204 and producing tension in cable 121 is constant force spring 206 whose other end coils about stationary shaft 205. Output gear 207 enables external transmission of the described motion. The lower output assembly as described is designated by numeral 136.

Shafts 116 and 103 are in line and their centerlines intersect the centerline of input member 101. Lower parallel mechanism 135 is of the same design as described for the upper parallel mechanism 107. Its shafts 208 and 202 are fixed rotatably along the same centerlines as shafts 103 and 116 respectively, of the upper parallel mechanism 107. The lower parallel mechanism 135 is connected to the upper parallel mechanism 107 by shaft 102 which is held by input member 101. Lower following link 133 is free to rotate about shaft 102 as is upper following link 112. Fixed to end link 209 of lower parallel mechanism 135 is output shaft 202. Captivated by yoke ends 210 and 211 as shown in FIGURE 3 of output shaft 202 is component member 212. Component member 212 is restricted to linear movement through the openings in said yoke and is in spaced parallel arrangement with end link 209. An opening 213 along the centerline of component member 212 allows movement about output shaft 116. End 118 of component member 212 captivates and rolls on following link 112. Yoke ends 210 and 211 of output shaft 202 are constructed in such a manner to clear a 90 degree area from input member 101 outwardly. Attached to the back end of component member 212 is cable 231 which extends around pulley 232 which is fixed to yoke end 211 but rotatable. An opening 233 greater than 90 degrees but restricted to provide sufficient cross section in output shaft 116 allows cable 233 to extend through the hollow center of shaft 116 upwardly. Cable 231 is maintained in tension by upper output assembly 130 which is the same design as described for lower output assembly 136. The tension provides force to maintain component member 212 against following link 112. A parallelogram is formed where component member 212 is in spaced parallel arrangement with lower following link 133 and component member 117 is in spaced parallel arrangement with upper following link 112.

In operation the angular and linear input information could be made available to the angular input shafts and input member from a source outside the casing and other than the gearing illustrated and described. In addition the actuating means for the linear input, the upper and lower parallel mechanisms may move independent of each other and at varying speeds. A linear input through the input member moves the following links along the parallel mechanisms to establish a predetermined length from the origin or output shaft. The angular inputs rotate the parallel mechanisms which in turn rotate the output shaft and following link. Because of the output shafts' relation to the end link and component member a parallelogram relationship is established, formed between the component members and the following links. The component members always represent the two different sides of the parallelogram. A triangle formed by the input member, component member, and following link is positioned by the linear and angular inputs. One component side is read out directly and the other indirectly in the form of the following link which is in spaced parallel arrangement with the other component member. Both component members are held in position by forces applied along their longitudinal centerlines. The movements of the component members are transmitted external to the unit.

Although I have described my invention with a certain degree of particularity it is understood that the present disclosure has been made only by way of example and that numerous changes in the details of construction and the combination and arrangement of parts may be resorted to without departing from the spirit and the scope of the invention as hereinafter claimed.

I claim as my invention:

1. A component computer having an external support, comprising in combination, an elongate rotary input member rotatively mounted in said support, a drive link extending outwardly from and fixed to said elongate rotary input member, an intermediate link with a longitudinal opening fixed to but rotatable with respect to said drive link, an elongate rotary output member in spaced parallel position with respect to said elongate rotary input member, an end link in spaced parallel position with respect to said drive link and fixed to but rotatable with respect to the intermediate link, said end link attached to and extending outwardly from the elongate rotary output member, a linear input member slidably mounted in said support transversely of said rotary input and output members, a following link extending outwardly from and fixed to but rotatable with respect to said linear input member, and element fixed to the outer end of said following link for sliding movement within the opening of the intermediate link, a tooth surface on one edge of said following link, an elongate component member having a tooth roller rotatively mounted at one of its ends, means mounting said component member on said rotary output member for rotation therewith and for endwise movement relative thereto, means urging said component member along its length toward said following link whereby said tooth roller and the tooth edge of said following link are in mesh, and means on said support indicating the position of said component member relative to said rotary output member.

2. A component computer according to claim 1 in which said urging means comprises in combination, a cable attached to the outer end of said component member, a pulley attached to said elongate rotary output member about which the cable is directed upwardly through an opening in the center of said elongate rotary output member, a take up pulley on said support upon which the cable is terminated, a rotating shaft to which said take up pulley is attached, a stationary shaft on said support, a force producing member for actuating said rotating shaft connected to said stationary shaft, and an output gear attached to said rotating shaft to transmit movement of the component member.

3. A component computer according to claim 1, a second drive link attached to said elongate rotary input member, a second intermediate link fixed to but rotatable with respect to the second drive link, a second following link attached to said linear input member at the first following link's pivot position, and contacting a second intermediate link, a second end link in spaced parallel arrangement with said second drive link and fixed but rotatable with respect to a second intermediate link, said second end link attached to and extending outwardly from the elongate rotary output member, a second component member attached to the output shaft in a similar manner as the first component member, and means to space position said first members to said second members so a parallelogram is formed with the second component member parallel to the first following link and the first component member parallel to the second following link.

4. A component computer requiring external support, comprising in combination, first and second axially aligned elongate rotary input members rotatively mounted in said support, a drive link attached to the first elongate rotary input member and extending outwardly in two directions, two intermediate links with elongated openings fixed but rotatable at opposite ends of said drive link, first and second axially aligned elongate rotary output members in spaced parallel positions with said elongate rotary input members, a linear input member, slidably mounted in said support transversely of said rotary input and output members, an end link of similar length and in spaced parallel arrangement with said drive link fixed to but rotatable with respect to the two intermediate links to actuate said first elongate rotary output member to the same degree of movement as said first elongate rotary input member, a following link extending on either side of and fixed but rotatable with respect to said linear input member, an element fixed at each end of said following link for movement within the respective elongated openings of the two intermediate links, a toothed surface on one edge of the following link, a first component member having a toothed roller rotatively mounted on one of its ends that contacts said toothed surface of the first following link and contains an opening for passage of said first elongate rotary output member, a yoke shaped element fixed to said first elongate rotary output member containing and fixing the rotary position of said first component member but allowing linear movement thereof relative to said first rotary output member, a second drive link attached to said second elongate rotary input member and extending outwardly in two directions, two second intermediate links with elongated openings fixed but rotatable at opposite ends of said second drive link in spaced parallel arrangement with said first intermediate links, a second end link similar in length and in spaced parallel arrangement with said second drive link fixed to but rotatable with respect to the two second intermediate links to actuate said second elongate rotary output member to the same degree of movement as said second elongate rotary input member, a second following link extending on either side of, and fixed to but rotatable with respect to said linear input member at the same pivot position as said first following link, an element fixed at each end of said second following link for movement within the respective openings of the two second intermediate links, a toothed surface on one edge of said second following link, a second component member having a toothed roller rotatively mounted on one of its ends that contacts said toothed surface of the second following link, a sleeve on said first elongate rotary output member sleeve that fixes the rotary position of said first component member but allows linear movement thereof relative to said second rotary output member, means for urging the component members toward their respective following links, and for positioning said first and second component members with said first and second following members in a parallelogram that makes the first component member parallel to the first following link and the second component member parallel to the second following link, and means for indicating the position of said component members relative to their respective elongate rotary output members.

5. A component computer according to claim 4 in which said urging means comprises, two cables attached individually to the outer ends of the component members, a pulley attached to the yoke end of said second elongate rotary output member just above said second component member that directs one cable through an opening in the first elongate rotary output member then upwardly through an opening in the center of said first elongate rotary output member, an upper takeup pulley on said support about which said cable attaches, a stationary shaft on said support, a force producing member for motivating said upper rotating pulley and mounted on said stationary shaft, an upper output gear attached to said rotating pulley for rotation therewith, a second pulley attached to said first elongate rotary output member just below said first component member directing the other cable through an opening in the center of said second elongate rotary output member, a lower takeup pulley similar to said upper takeup pulley mounted on said housing, a lower rotating pulley, a second stationary shaft on said support, a second force producing member on said second stationary shaft for motivating said lower rotating pulley, and a lower output gear attached to said lower rotating pulley for a rotation therewith.

6. A component computer, having an external support comprising in combination, an elongate rotary input member mounted in the support, an elongate rotary output member mounted in the support in spaced parallel arrangement with said elongate rotary input member, a parallel linkage actuated by said elongate rotary input member, said parallel linkage comprising a pair of angularly spaced drive links fixedly attached to said input member and extending radially outwardly therefrom, a pair of end links fixedly attached to said output member and extending radially outwardly therefrom and a pair of parallel intermediate links, each of said intermediate links being pivotally connected at one of its ends to a drive link and at its other end to an end link to maintain each of said end links parallel to a corresponding drive link, a linear input member mounted in the support in perpendicular arrangement with said elongate rotary input and elongate rotary output members for axial sliding movement, a pair of following links fixedly attached together and pivotally connected to said linear input member between said angular input member and said angular output member at their inner ends, said following links extending outwardly to their respective intermediate links and attached thereon for rotational and translational movement, two component members mounted on said elongate rotary output member for rotation therewith and sliding movement thereon, said component members at their inner ends being in forced rotational and translational contact with their respective following links, two linear output members on said support and transmission means from each of said component members to each of said output members to indicate the component members' positions relative to their respective rotary output members.

7. A component computer, having an external support, comprising in combination, two elongate rotary input members mounted in the support, two elongate rotary output members mounted in the support in spaced parallel arrangement with said elongate rotary input members, two parallel linkages each actuated separately by a respective elongate rotary input member and actuating separately their respective elongate rotary output members, said parallel linkages comprising, individually, a drive link fixedly attached to one of said input members and extending radially outwardly therefrom in two directions, an end link fixedly attached to a corresponding one of said output members and extending radially outwardly therefrom in two directions, and a pair of parallel intermediate links, each of said intermediate links being pivotally connected at one of its ends to the drive link and at its other end to the end link to maintain said end link parallel to its corresponding drive link, a linear input member mounted in the support in perpendicular arrangement with said elongate rotary input and elongate rotary output members for axial sliding movement, two following links actuated separately and pivotally connected to said linear input member between said elongate rotary input members and said elongate rotary output members at their inner ends, said following links extending outwardly in two directions to their respective intermediate links and attached thereon for rotational and translational movement, two component members mounted on said respective elongate rotary output members for rotation therewith and sliding movement thereon, said first component member at its inner end in forced rotational and translational contact with the following link of the second parallel linkage, said second component member at its inner end in forced rotational and translational contact with the following link of the first parallel linkage, two linear output members on said support, and transmission means from each of said component members to each of said output members to indicate the component members' positions relative to their respective rotary output members.

References Cited by the Examiner

UNITED STATES PATENTS

| 2,463,788 | 3/1949 | McQuckin | 33—98 X |
| 2,553,526 | 5/1951 | Chapple et al. | 235—61 |
| 2,857,673 | 10/1958 | Gabriel | 33—98 X |
| 3,002,679 | 10/1961 | Abel | 33—1 X |

FOREIGN PATENTS

| 850,107 | 12/1939 | France. |
| 974,443 | 2/1951 | France. |
| 541,410 | 1/1932 | Germany. |
| 767,986 | 6/1955 | Germany. |

LEONARD FORMAN, *Primary Examiner.*

ISAAC LISANN, *Examiner.*

S. S. MATTHEWS, *Assistant Examiner.*